D. M. CROWDER.
HOG-TRAP.

No. 174,205. Patented Feb. 29, 1876.

WITNESSES:
Levi V. Graham
Jno. Th. Lyon

INVENTOR:—
David M. Crowder,
per.
Chas. P. Kousens,
His Atty.

UNITED STATES PATENT OFFICE.

DAVID M. CROWDER, OF BETHANY, ILLINOIS.

IMPROVEMENT IN HOG-TRAPS.

Specification forming part of Letters Patent No. 174,205, dated February 29, 1876; application filed January 10, 1876.

*To all whom it may concern:*

Be it known that I, DAVID M. CROWDER, of Bethany, in the county of Moultrie and State of Illinois, have invented a new and useful Improvement in Hog-Traps, which improvement is fully set forth in the following specification, reference being had to the accompanying drawings.

The object of my invention is to so construct a hog-trap that it can be adjusted by means of a swinging gate to force the hog (either large or small,) to the front part of the trap, where the yoke is placed, and the hog held for ringing or snouting; also, so arranged that when the hog is caught and held by said yoke, that, by means of a hinged platform, the hog can be laid on its side and the swinging gate opened for spaying or castrating.

Figure 1:
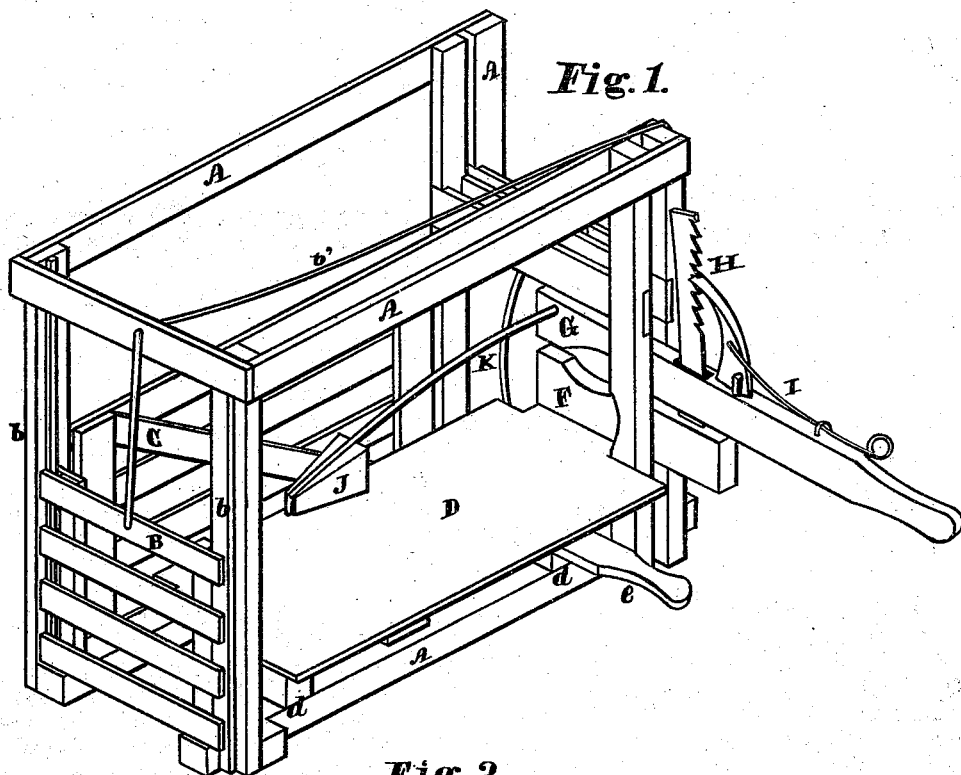
Figure 2:
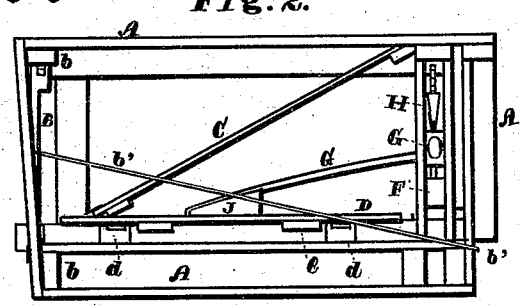
Figure 3:
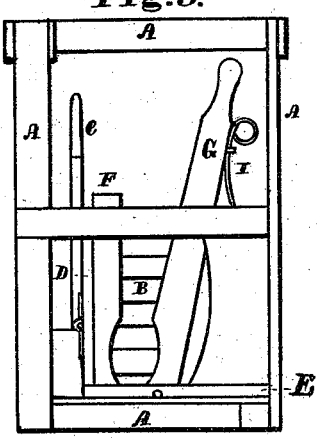

Figure 1 is a perspective view of a hog-trap embodying my invention. Fig. 2 is a plan of the same; and Fig. 3 is an end elevation of Fig. 1, showing platform in a vertical position.

A is the main frame. B is a gate at the rear end of the trap, sliding in grooves in the uprights $b\ b$, and operated at the front of the trap by means of the cord $b'$. C is a gate hinged on the side of the trap. D is a platform hinged on the uprights $d\ d$, and provided with the handle $e$. E is a piece at right angles with the platform, and to which and the platform the yoke F is attached. The yoke G is pivoted on the piece E, and is held in position by means of the ratchet and pawl H, said pawl being lifted by means of the rod I. A block, J, serves as a support for the rod K, and holds it from the platform.

The trap is operated as follows: The gate B is raised and the hog driven into the trap until it is caught by the neck in the yokes F G. If the hog is small it can be forced into the yoke by closing the gate C, (see Fig. 2,) which swings inward as well as outward. The yoke G, when closed on the hog's neck, is held by means of the ratchet H. After the animal is caught and it is desired to lay it on its side for spaying or castrating, the platform D is brought in a horizontal position, as shown in Fig. 1, (and secured by a pin, $p$, in the piece E,) by means of the handle or lever $e$. The front legs of the animal are caught between the rod K and the platform, which helps to hold it when laying it on its side, the gate C opening for convenience of access to the animal.

I claim as my invention—

1. In a hog-trap, the combination of the frame A, sliding gate B, swing-gate C, platform D, yokes F G, and ratchet and pawl H, substantially as described.

2. In a hog-trap, the combination of the frame A, gate C, platform D, rod K, yokes F G, and ratchet and pawl H, substantially as described.

DAVID M. CROWDER.

Witnesses:
LEVI P. GRAHAM,
JNO. W. LYON.